UNITED STATES PATENT OFFICE.

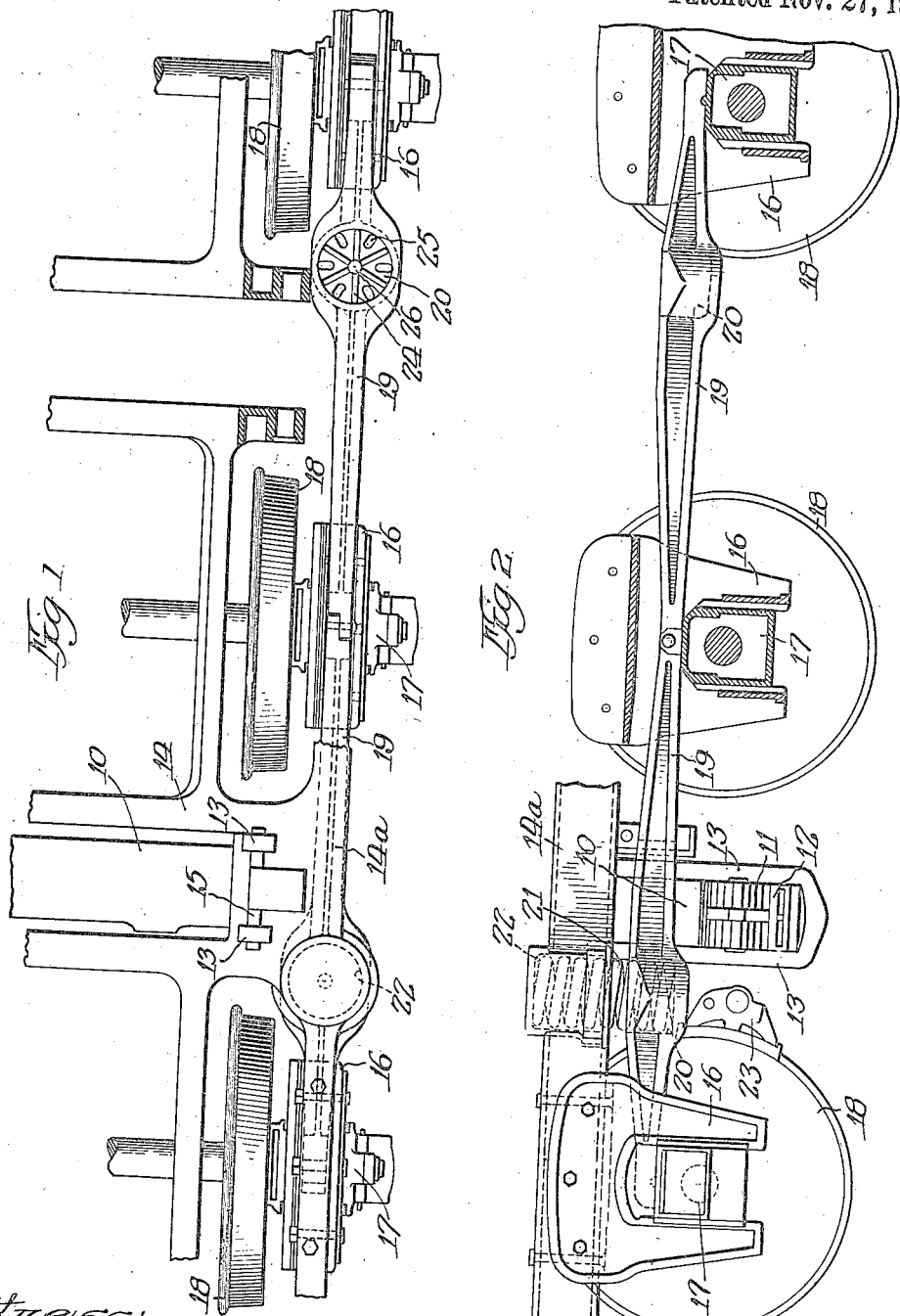

PETER PARKE AND CHARLES S. KNAPP, OF CHICAGO, ILLINOIS, ASSIGNORS TO THE PULLMAN COMPANY, OF CHICAGO, ILLINOIS, A CORPORATION OF ILLINOIS.

EQUALIZER FOR SIX-WHEEL TRUCKS.

1,247,872.  Specification of Letters Patent.  Patented Nov. 27, 1917.

Application filed September 1, 1917. Serial No. 189,283.

*To all whom it may concern:*

Be it known that we, PETER PARKE and CHARLES S. KNAPP, citizens of the United States, residing at Chicago, in the county of Cook and State of Illinois, have invented certain new and useful Improvements in Equalizers for Six-Wheel Trucks, of which the following is a specification.

The present invention relates to six-wheel car trucks of the Pullman type and more especially to the form of equalizer bar, being in many respects an improvement upon that form of equalizer construction shown in the patent to L. J. Berg, granted March 27, 1917, No. 1,220,170.

Previous to the development of the Berg type of truck it was customary in four-wheel and six-wheel car truck construction to make the equalizer bars resting on the journal boxes of a form having a depressed or bellied central portion, which style of bar has been necessary to provide sufficient space for the accommodation and reception of the equalizer bar springs interposed between the truck frame wheel pieces and the equalizer bars. In six-wheel trucks of the Pullman type it had theretofore been impossible or at least inconvenient to use two brake shoes for each wheel, particularly for the inside of the outer wheels, because the various parts of such structure and more especially the equalizer bars and springs prevented a ready replacement of worn shoes. To provide a truck arrangement in which the brake shoes on both sides of the wheels can readily be inspected has therefore been the aim and object of truck designers for some considerable time. Many of the forms of construction proposed have contemplated the entire elimination of the type of equalizer extending in one piece from journal box to journal box.

The Berg type of truck practically solved the problem by making the equalizer bar straight and forming a recess or pocket on the under side of the wheel piece of the truck frame for the accommodation of the springs, whereby the equalizer bars and accessory parts were so placed as to permit access to the brake shoes for inspection, adjustment and replacement. However, as the bearing of the helical springs upon the top of the equalizer bar was in a horizontal plane above that of the contact of the ends of the equalizer bars with the journal boxes, there was brought about a condition of unstable equilibrium and as a result it was found to be difficult to maintain the equalizers in position, they having a tendency to tilt both from the longitudinal and transverse motion of the car.

The principal object of the present invention, therefore, is the embodiment in equalizer bars of the Berg type of certain improved features which, while preserving all the advantages of the Berg type, remedy the disadvantages above pointed out, insuring easy riding qualities, access to the brake shoes, and stable equilibrium of the parts. This is accomplished, generally speaking, by housing the helical springs not only within a recess in the lower portion of the wheel piece, but in an opposed recess formed in the upper space of the equalizer bar, bringing the point of application of the spring pressure to the equalizer bar downward into a plane no higher and preferably somewhat lower than the plane of application of the equalizer bars to the journal boxes. Other advantageous details of construction will be apparent from the following detailed description based upon an illustrative showing of a preferred embodiment of the invention in the accompanying drawings. As the invention is susceptible of embodiment in other and varied constructional forms, it is to be understood that the drawing and description are illustrative only and are not to be taken in an unnecessarily limiting sense.

In the drawings—

Figure 1 is a fragmentary top plan view of a portion of the truck frame and the truck including the equalizer bar; and Fig. 2 is a similar view of the parts illustrated in Fig. 1 taken in side elevation and partly in vertical section.

As is customary in constructions of this general character, the truck is shown as equipped with a pair of truck bolsters 10, which support the load of the car body in the usual manner, each of these bolsters at its opposite end being supported on leaf bolster springs 11, interposed between the truck bolsters 10 and the spring planks 12 carried in hangers 13 supported by and pivotally hung on the truck frame 14 at 15. This truck frame is illustrated as supplied with the usual pedestals 16 coöperating with the journal boxes 17 provided for the axles equipped with the car wheels 18. Resting on the top of these journal boxes at each side of the truck we employ the two substantially straight equalizer bars 19—19 which, if desired, may be made of greater depth directly beneath the equalizer bar springs hereinafter referred to than at their ends bearing on the journal boxes.

Each of the equalizer bars is equipped with a recess or pocket 20 to accommodate the bottom end of an equalizer bar spring 21, the upper end of each of said springs being accommodated within a similar recess or pocket 22 constituting a hollow integral enlargement of the wheel piece 14ª of the truck frame 14.

It will be observed that the wheel piece pockets 22 are open below and closed above, the springs 21 bearing upwardly against the closed end of the recess 22 while the lower ends of said springs bear against the closed bottom end of the recess or pockets 20. It will also be observed that the seat bearing of the spring 21 upon the equalizer bar 19 is in a horizontal plane below the horizontal plane of the top of the journal boxes at the points where the ends of equalizer bars rest upon the same. This brings the entire equalizer bar construction and appurtenant parts sufficiently above the center of the brake shoes, one of which is indicated at 23, to afford ready access to all of said brake shoes while, at the same time, the weight transmitted through the springs 21 is applied to the equalizer bars below the points at which they transfer the weight to the journal boxes, thus insuring stable equilibrium.

The spring recesses or pockets 20 are advantageously provided in their bottom with ribs 24 upon which the lower ends of the springs rest, while between said ribs are grooves 25 which conduct any moisture entering said recesses to a central discharge opening 26.

We claim:

1. In a car truck, the combination with a truck frame including a wheel piece, journal boxes, wheels and brakes, of an equalizer bar disposed above the center line of brake shoes and bearing on the journal boxes, and a spring disposed between the wheel piece and bar with its lower end bearing upon the bar below the horizontal plane of the bearing of the bar on the journal boxes.

2. In a car truck, the combination with a truck frame including a wheel piece, journal boxes, wheels and brakes, of an equalizer bar disposed above the center line of brake shoes and bearing on the journal boxes, the bar having an upwardly opening spring pocket, and a spring disposed between the wheel piece and bar in the pocket with its lower end seated below the horizontal plane of the bearing of the bar on the journal boxes.

3. In a car truck, the combination with a truck frame including a wheel piece, journal boxes, wheels and brakes, of an equalizer bar disposed above the center line of brake shoes and bearing on the journal boxes, the bar having an upwardly opening spring pocket, the wheel piece having an oppositely disposed downwardly opening spring pocket, and a spring disposed between the wheel piece and bar in the pocket with its lower end seated below the horizontal plane of the bearing of the bar on the journal boxes.

4. In a car truck, the combination with a truck frame including a wheel piece, journal boxes, wheels and brakes, of an equalizer bar disposed above the center line of brake shoes and bearing on the journal boxes, the bar having an upwardly opening spring pocket, and a spring disposed between the wheel piece and bar in the pocket with its lower end seated below the horizontal plane of the bearing of the bar on the journal boxes, the spring pocket of the bar having in its bottom bearing ribs for the springs, and a drain opening for moisture entering said pocket.

5. In a railway car truck, the combination of journal boxes, a straight equalizer bar bearing on said journal boxes, a truck frame having a wheel piece, and a spring interposed between said equalizer bar and said wheel piece and bearing on said equalizer bar below the horizontal plane of the bearing of the bar on the journal boxes, whereby to render accessible for repairs and renewal brake shoes disposed between the wheels in the space spanned by the equalizer bar, and to maintain the equalizer bar in stable equilibrium.

6. In a six-wheel car truck, the combination of journal boxes, an equalizer bar bearing on said boxes and disposed above the wheel axles at all points, said bar having a recess in its upper face with the bottom of the recess in a horizontal plane below the plane of the bearing of the bar on the journal boxes, a truck frame having a wheel piece, and a spring disposed between the equalizer bar and truck frame and accommodated in the recess of the equalizer bar, whereby to render accessible for repairs and renewal brake shoes disposed between the wheels in the space spanned by the equalizer bar and to maintain the equalizer bar in stable equilibrium.

7. In a car truck, the combination of a truck frame including a wheel piece, journal boxes, wheels and brakes, of a substantially straight equalizer bar disposed above the brake beam and bearing on the journal boxes, the bar having an upwardly opening spring pocket with its bottom below the horizontal plane of the bearing of the bar on the journal boxes, the wheel piece having an oppositely disposed downwardly opening spring pocket, and a spring disposed between the wheel piece and bar in the pocket, whereby to render accessible for repairs and renewal brake shoes disposed between the wheels in the space spanned by the equalizer bar and to maintain the equalizer bar in stable equilibrium.

In testimony whereof we have hereunto signed our names in the presence of two subscribing witnesses.

PETER PARKE.
CHARLES S. KNAPP.

Witnesses:
C. H. POOLE,
G. C. PHILLIPS.